United States Patent [19]

Buchholz

[11] 4,017,774
[45] Apr. 12, 1977

[54] BOTTLE LABELING SYSTEM

[75] Inventor: Rainer Buchholz, Dusseldorf-Gerresheim, Germany

[73] Assignee: Jagenberg Werke AG, Dusseldorf, Germany

[22] Filed: May 30, 1975

[21] Appl. No.: 582,535

Related U.S. Application Data

[63] Continuation-in-part of Ser. No. 347,955, April 1, 1973, abandoned.

[30] Foreign Application Priority Data

Apr. 29, 1972 Germany ............................ 2221199

[52] U.S. Cl. .................................... 318/39; 318/57; 318/67; 318/314
[51] Int. Cl.² .......................................... H02P 5/46
[58] Field of Search .................. 318/39, 57, 66–71, 318/314, 318

[56] References Cited

UNITED STATES PATENTS

| | | | |
|---|---|---|---|
| 3,064,173 | 11/1962 | Breen et al. | 318/314 |
| 3,139,217 | 6/1964 | Mell | 318/39 |
| 3,585,470 | 6/1971 | Connors | 318/67 |
| 3,704,401 | 11/1972 | Miller | 318/59 |

Primary Examiner—Gene Z. Rubinson
Attorney, Agent, or Firm—Burgess, Dinklage & Sprung

[57] ABSTRACT

A method for coordinating the rate of processing of a container at a processing station with the rate of feed of said container to and removal from said processing station, comprising selecting a predetermined rate for said processing and said feed and removal, independently and continuously comparing the actual processing rate with said selected rate, independently and continuously comparing the actual feed and removal rate with said selected rate, and independently adjusting the actual rate of processing and the actual rate of feed and removal as needed to arrive at said selected rate. A corresponding apparatus is described wherein the speed selecting means includes a potentiometer. A pair of tachogenerators respond independently to the actual speeds of processing and conveying and these are independently electronically compared with the selected speed established by the potentiometer, the driving speeds being independently adjusted as needed in response to the comparisons.

3 Claims, 4 Drawing Figures

BOTTLE LABELING SYSTEM

This application is a continuation-in-part of Application Ser. No. 347,955, filed Apr. 1, 1973, now abandoned.

The invention relates to a method of controlling the output of labeling systems and other bottle processing systems, and it relates also to an apparatus for the practice of this method.

In the large and sometimes very extensive bottle processing machinery being used today, there is an increasing tendency to separate the drive systems of the conveyors between the individual machines from the bottle processing machines with which they are associated, e.g. labeling machines. In such cases, however, precautions must be taken so that the speeds of the associated conveyors will be coordinated with the rate of passage of the bottles through the labeling machine, so as to avoid trouble in the form of bottle jam-ups or gaps in the train of bottles. To achieve synchronism between the conveyors and the labeling machines, the conveyor chains have hitherto been driven directly by the bottle processing machine through gear trains and/or universal-joint shafts. Whereas direct drive has created favorable drive conditions for the operation of the bottle transport means of the infeed conveyor, since the bottle transport means is pulled rather than pushed, the drive conditions for the operation of the bottle transport means of the outfeed conveyor are substantially poorer, because such means are usually chains lying loosely on guiding rails and, owing to the unfavorable transmission connections, they have to be pushed and thus they give rise to transport disturbances. To avoid this disadvantage it has already been proposed that the conveyor chain drive be located at the remote end of the conveyor and that Cardan shafts be used to provide a drive connection with the labeling machine, thereby achieving synchronism. By this measure the conveying of the labeled bottles away from the labeling machine has been improved, but this construction has necessitated the acceptance of the disadvantage of the long Cardan shafts and their multiple bearings. Furthermore, in addition to the need of providing covers for these Cardan shafts to protect them against disturbance and provide safety from accidents, an additional burden is created by the maintenance of these shafts.

It is accordingly an object of the present invention to coordinate the outputs of individual machine units of a bottle processing system with one another such that a trouble-free passage of the bottles through the entire system can be achieved.

This and other objects and advantages are realized in accordance with the invention pursuant to which the operations of the bottle processing system and of the infeed and outfeed conveyors associated therewith are established at predetermined speeds, and the actual speed measured at each machine unit is compared with the intended predetermined rate of speed, and that in case of differences a correction is made independently in each machine unit. For the practice of this method an apparatus is proposed in which only a single potentiometer is provided for the common correction of the speed of operation of the bottle processing machine and of the infeed and outfeed conveyors, but each independently driven machine unit is equipped with a tachogenerator of its own, with an appropriate electronic system for comparing the actual speed with the required speed, as well as a transmission adjusting motor for speed correction.

The advantages attained with the invention consist especially in the fact that the establishment of a single predetermined speed will give the assurance that the bottle being processed will be moved at the same speed through all of the automatically driven machine units of the bottle processing system. Furthermore, due to the elimination of mechanical drive connections, such as Cardan shafts or chain drives, between the processing machine and the individual infeed and outfeed conveyor units, substantially greater layout flexibility is created, since the conveyor chain drive can always be arranged properly at the end of each conveyor run, regardless of how far away it is from the processing machine. Another advantage resides in the fact that, if the processing machine is stopped or is being run at an idling speed while trouble is being eliminated and is thereafter restarted or accelerated to its normal speed, all of its associated conveyors will be automatically accelerated with it so that their speed will match the speed of the processing machine.

An embodiment of the invention is shown diagrammatically in the drawings, wherein.

Figure 1:
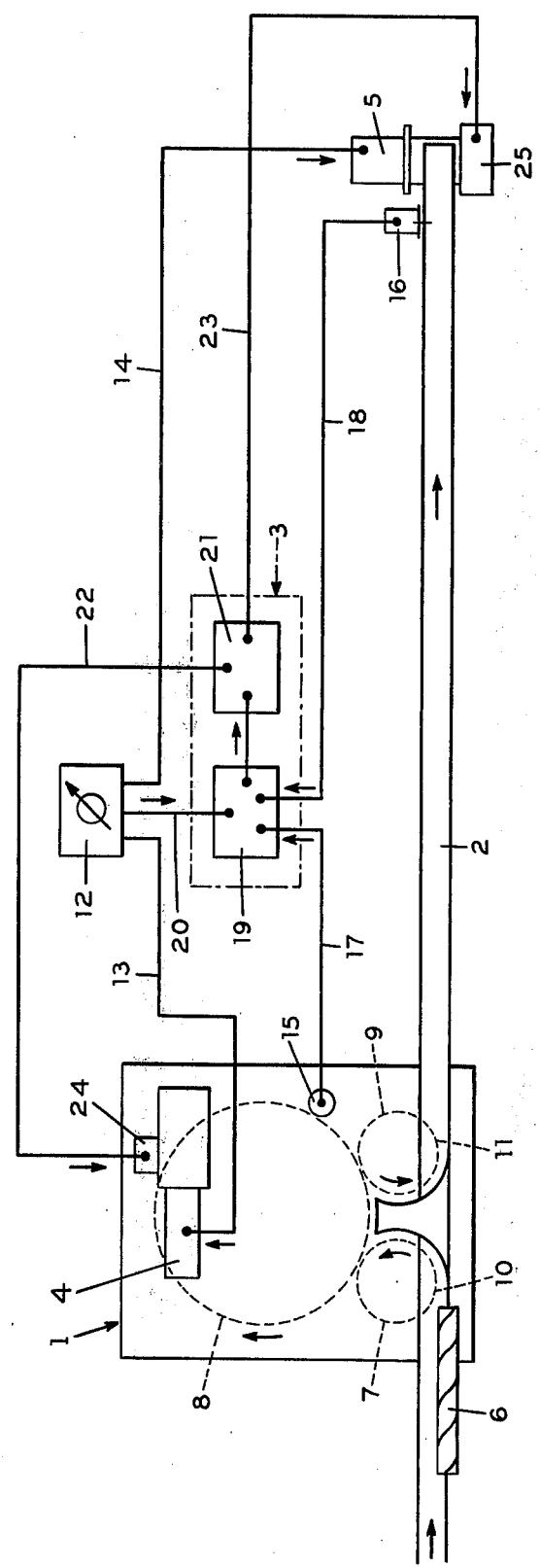
FIG. 1 is a schematic illustration of an apparatus in accordance with the present invention.

Referring now more particularly to FIG. 1, the bottle processing installation shown consists essentially, for example, of a labeling machine 1, the infeed and outfeed conveyor chain 2, the control system 3 and the separate drives 4 and 5 for the labeling machine 1 and the conveyor 2, respectively. The bottles to be labeled come from the filling machine, which is not shown, and are delivered by the spacing screw 6 to the infeed star wheel 7 and to the rotary table 8, and after the labeling process they pass to the outfeed star wheel 9 and thence back onto the conveyor chain 2. From here the now labeled bottles are delivered on for further processing.

The manner of operation of this controlled-output system is the following. Since during their forward movement in the area of the labeling machine 1 the bottles are taken from the conveyor chain 2 by the infeed star wheel 7 and are returned to the conveyor chain 2 by the outfeed star wheel 9 to be carried away, critical conveyor situations develop at the transition points 10 and 11 between the conveyor chain 2 and the star wheels 7 and 9, in which, in the event of uncoordinated conveyor speeds, the proper sustained advancing movement of the bottles might be endangered. For this reason it is necessary to enable the speed of the individual machine units to be coordinated with one another. This possibility of speed coordination must also be assured whenever the entire installation or parts thereof are started up again after a disturbance, with an automatic reattainment of the output that had been reached prior to the disturbance. Neither may the speed changes which were performed during the running state be disregarded. This is done through a speed presetting means 12 which may be in the form of a potentiometer, for example, by which the entire installation is adjusted to an optimum output between zero and the maximum, in accordance with the running behavior of the bottles, i,e., whenever the output is preset or changed, both of the drive motors involved, 4 and 5, are adjusted simultaneously through lines 13 and 14 by only one speed presetting means 12 to an identical conveyor speed. In order to determine precisely the actual speed of the individual machine units, separate tachogenerators 15 and 16 are provided on the corresponding conveyor systems, which through lines 17 and 18, respectively, deliver an electric voltage proportional to the actual rate of transport to the input of a comparison system 19. In this comparison system 19, the two generator voltages representing the actual speed values are compared with the preset value introduced by the speed presetting means 12 through line 20. In accordance with the measured deviations from the preset speed, pulses are delivered to the relay control 21 from whence corresponding controlling pulses are delivered through the control lines 22 and 23, respectively, to the adjusting motors 24 and 25, respectively, of the drive motors 4 and 5, respectively.

By the above-described method any difference of speed in the individual machine units is detected and automatically corrected to the preset speed.

Figure 2:
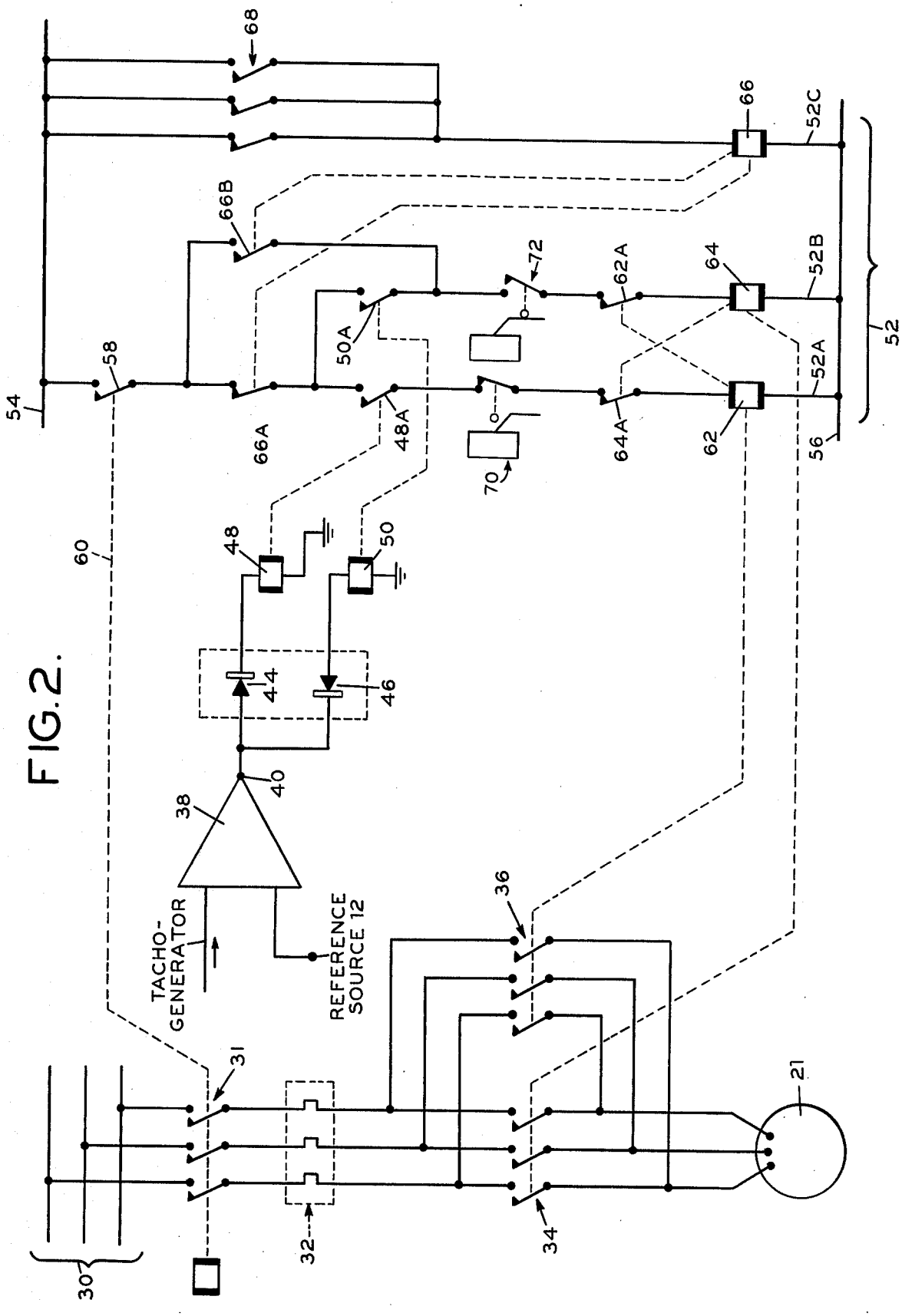
FIG. 2 is a wiring diagram of a system for controlling an adjusting motor.

An exemplary control system is illustrated in FIG. 2 for effecting controls of an adjusting motor 24. The motor 24 as shown is a conventional three phase AC motor driven from a suitable three phase source indicated generally as 30. A power switch 31 having three ganged elements is coupled to the source of power 30, and includes suitable overload or circuit breaker protectors 32, two relay operated switch sets 34 and 36 are provided for coupling to the motor. When switch 34 is closed and 36 is open, power is applied to the motor 24 in a manner causing it to rotate in a first direction. When switch 36 is closed and 34 is open, the motor is caused to run in the opposite direction, as is evident from the connections of the respective switches.

The output of the tachogenerator 15 is coupled to one input of a conventional differential amplifier or comparator circuit 38. The remaining input of the circuit 38 is coupled to the fixed reference source 12. The circuit 38 is set such that when the generator 15 voltage is higher than the reference voltage 12, a positive signal is emitted at terminal 40. When the generator 15 voltage is lower than the reference voltage, a negative signal is produced at the terminal 40.

The routing circuit including unipolar conduction devices such as the diodes 44 and 46 conduct the positive or negative voltage levels through the respective control relays 48 and 50. A positive output voltage on terminal 40 will be conducted through diode 44 to energize relay 48, but will be blocked by diode 46, thus not energizing relay 50. Conversely, a negative output voltage on terminal 40 will be conducted through diode 46 to energize relay 50, but will be blocked by diode 44, thus not energizing relay 48. The circuit 38 can be set such that the generator 15 voltage may vary within a certain range of the reference voltage, i.e., ± 5%, before an output signal is produced by the circuit 38. This prevents energization of both relays 48 and 50 during that interval.

Relay 48 is provided with contact 48A, and relay 50 is provided with contact 50A. These contacts are located in the control circuit 52. The control circuit 52 includes power lines 54 and 56, and a power switch 58, which may be ganged with motor power switch 31, as shown by the dashed dot line 60.

Included in the control circuit 52 are motor directional control relays 62 and 64, respectively. Relay 62 includes a first set of contacts 36 and a second contact 62A. Relay 64 includes a first set of contacts 34 and a second contact 64A. The control circuit 52 thus includes two sets of control lines 52A and 52B. The control line 52A including relay 62 becomes energized by operation of the relay 48 closing the contact 48A and thus forming a closed path between the power lines 54 and 56 through the relay 62. As a result, the switch 36 will close allowing the motor 24 to rotate in a predetermined direction. At the same time, contact 62A will open, thereby preventing control lines 52A and 52B from having any possibility of overlap. Conversely, energization of relay 50 causing the closure of contact 50A will close the circuit between power lines 54 and 56, thus energizing relay 64. As a result, switch 34 will close causing motor 24 to run in the opposite direction and at the same time relay contact 64A will open preventing control line 52A from interfering with the operation of control line 52B. Thus, it will be seen that the alternate energization of relays 48 and 50 will cause the motor 24 to run in opposite direction. Presumably, the adjustment of the motor speed by virtue of operation of motor 24 will cause the appropriate tachogenerator unit 15 to provide a signal which will then approach the reference signal causing the output of circuit 38 to be reduced within the tolerance range relative to the reference source thereby eliminating the output signal at terminal 40, causing the appropriate relay 48 or 50 to become de-energized. As a result the appropriate contact 48A or 50A will open thereby terminating the operation of control relay 62 or 64.

Certain other functions may be performed by the control circuit 52. As will be evident, a further control relay 66 is provided with contacts 66A and 66B. The arrangement of these contacts is such that energization of the relay 66 will cause the opening of contact 66A and the closure of contact 66B. As a result, power is applied between lines 54 and 56 through relay 64 causing the motor generator 24 to run to its highest predetermined limit or lowest predetermined limit depending on whether the direction controlled by the relay 64 through switch 34 is so designated. This function may be employed as an emergency override of the control circuit by means of the activation of the switches shown generally as 68. These plurality of switches may measure various functions performed along the conveyor chain 2. For example, the switches may measure such features as bottle height, overflow conditions, escape conditions, or other conditions indicating some fault in the line which would require the control circuit to be disabled automatically. These conditions may be represented by either the opening or the closing of the switch. In any event, if any of the switches shown as 68 should close, the relay 66 becomes activated, and the control line 52C thus causes the operation as described previously.

Finally, each control line 52A and 52B contains a limit switch. The function of the limit switch in line 52A, designated generally by the numeral 70 is to disable relay 62 when the motor 24 reaches some predetermined limit determined by its direction of rotation caused by the closing of the switch 34. Similarly, in line 52B the limit switch designated generally by the reference numeral 72 performs the equivalent function in the opposite direction of motor rotation.

Figure 3:
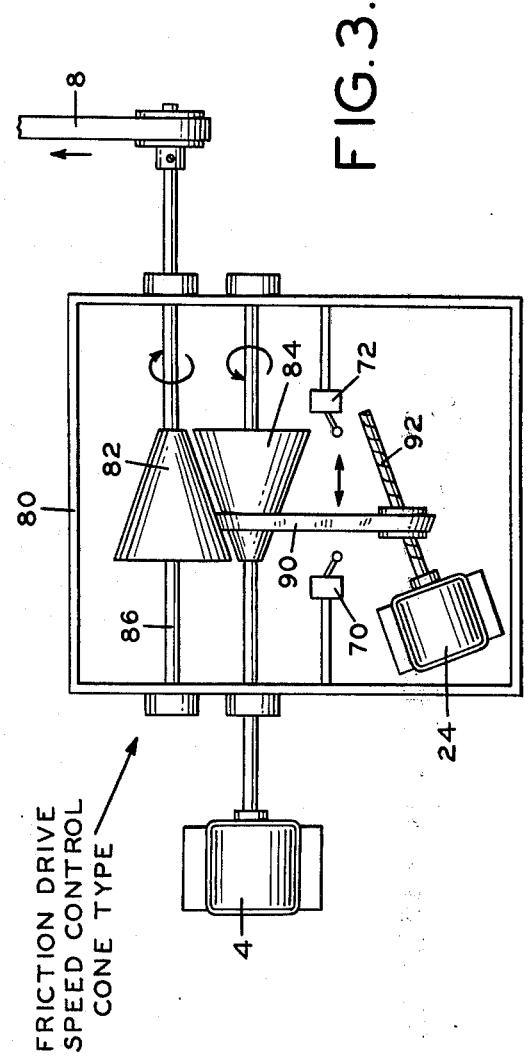
FIG. 3 is a side elevation of a representative mode of motor control.

Referring to FIG. 3, a representative mode of motor control is illustrated. As was stated hereinabove, the use of the motor 24 is deployed to vary the speed of the main transport motor 4. This may be accomplished in any one of a number of well known methods including the use of differential gearing, belt drives, pulley drives, friction drives, or other types of speed control. By way of illustration, a conventional friction drive speed control of the cone type is illustrated in FIG. 3. As shown therein, a housing 80 encloses a pair of oppositely positioned cones 82 and 84 which are driven about their respective shafts 86 and 88 and terminated in appropriately positioned end bearings which are mounted in the housing wall. The cones are interconnected by means of a belt 90 of suitable friction material which encircles the lower cone 84 and rotates in accordance with the drive provided by motor 4. The motor 4 rotation along shaft 88 is transmitted to cone 84 which in turn is transmitted through the belt 90 to the cone 82 in proportion to the relative diameters of the cones at the point of contact of the drive belt 90. This in turn causes rotation of the shaft 86 which in turn causes rotation of the appropriate mechanism driving the transport 8. When the motor 24 is adjusted by means of controlling the switches 34 and 36 as was described in connection with FIG. 2, the output shaft 92 of the motor 24 rotates causing the belt 90 to be driven up along the contact between the cones 82 and 84, thereby adjusting the relative speeds between the two cones 82 and 84 in proportion to the variation in the diameters as is evident by an examination of the figure and as is conventional in friction drive speed controls of the cone type. Thus, adjustment of the motor 24 will cause the speed with which motor 4 transmits rotational energy to conveyor transport 8 to be varied. The limit switches 70 and 72 described in FIG. 2 may be preset at appropriate positions representing the limit of travel of the drive 90 as is shown in FIG. 3.

It should be evident that although FIGS. 2 and 3 have been illustrated in connection with the drives of the motor 4 and motor 24, that precisely the same circuit configurations, drives and mechanisms are equally applicable to the relationship between motors 5 and 25.

Figure 4:
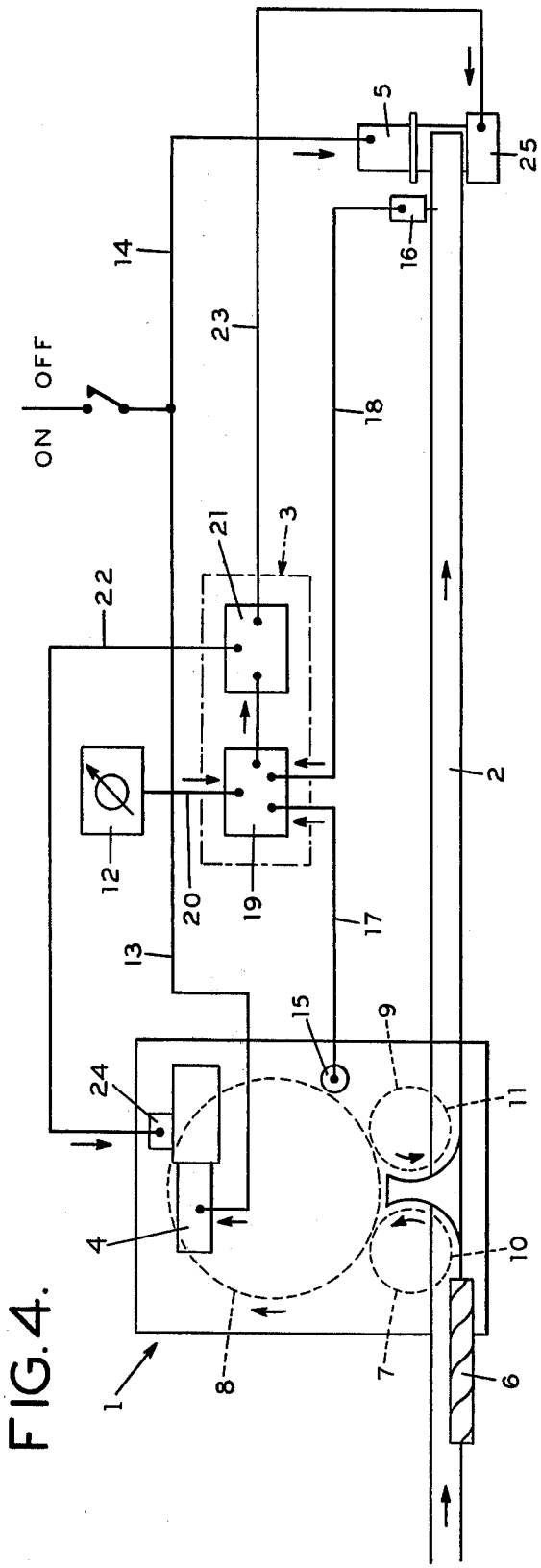
FIG. 4 is a schematic illustration of an alternate apparatus in accordance with the invention.

Referring now to FIG. 4, a further alternate embodiment of the embodiment shown in FIG. 1 is illustrated. As shown in FIG. 4, which corresponds precisely to that of FIG. 1, with one exception, the reference source 12 is coupled only to the control element 3. The main motors 4 and 5 are now directly coupled to a single power source and run at a constant speed without regard to the reference source 12. Thus, in the embodiment of FIG. 4, adjustment of the reference source 12 will affect only the rotation of the control motors 24 and 25.

The motor control circuits shown in FIGS. 2 and 3 may be obviously replaced by other alternatives. For example, should the motor controls be DC operated, a DC source employing only single switching rather than switching over three phases to reverse the polarity of the drive to the adjusting motors may also be provided. Other variations, modifications and alternatives will be clearly apparent to one skilled in the art.

It will be appreciated that the instant specification and examples are set forth by way of illustration and not limitation, and that various modifications and changes may be made without departing from the spirit and scope of the present invention.

What is claimed is:

1. An apparatus for labelling containers comprising a first transport for driving said containers to and from a labelling station, and a second transport placing labels on said containers, each of said first and second transports independently motor controlled, a first motor for controlling said first transport and a second motor for controlling said second transport, a third motor for adjusting the speed of said first motor and a fourth motor for adjusting the speed of said second motor, means for deriving a signal having a magnitude representing the speed of said first transport, means for deriving a signal having a magnitude representing the speed of said second transport, a reference source, means for comparing said reference source against each of said signal levels to determine deviation of each said transport speed from said reference source, a line for controlling the speed of said third motor in response to a deviation between the magnitude of the signal representative of the speed of said first transport and said reference signal, and a line for controlling the speed of said fourth motor in response to a deviation between the magnitude of the signal representative of the speed of said second transport and said reference signal, each of said control lines for the third and fourth motor speeds including switching means responsive to said deviation for energizing a contact for applying power to said third and fourth motors in respectively opposite directions.

2. The apparatus of claim 1, wherein said first and second motors are driven by a power source independent of said reference source.

3. An apparatus for labelling containers comprising a first transport for driving said containers to and from a labelling station, and a second transport placing lables on said containers, each of said first and second transports independently motor controlled, a first motor for controlling said first transport and a second motor for controlling said second transport, a third motor for adjusting the speed of said first motor and a fourth motor for adjusting the speed of said second motor, means for deriving a signal having a magnitude representing the speed of said first transport, means for deriving a signal having a magnitude representing the speed of said second transport, a reference source, means for comparing said reference source against each of said signal levels to determine deviation of each said transport speed from said reference source, means for controlling the speed of said third motor in response to a deviation between the magnitude of the signal representative of the speed of said first transport and said reference signal, means for controlling the speed of said fourth motor in response to a deviation between the magnitude of the signal representative of the speed of said second transport and said reference signal, a plurality of monitoring switches for monitoring container conditions along said first and second transports, and means responsive to the activation of said switches for overriding said third and fourth motor controls.

* * * * *

UNITED STATES PATENT AND TRADEMARK OFFICE
CERTIFICATE OF CORRECTION

PATENT NO. : 4,017,774
DATED : April 12, 1977
INVENTOR(S) : Rainer Buchholz

It is certified that error appears in the above-identified patent and that said Letters Patent are hereby corrected as shown below:

| | |
|---|---|
| Title Page, Inventor | cancel "Dusseldorf" and substitute -- Düsseldorf -- |
| Title Page, Assignee | cancel "Dusseldorf" and substitute -- Düsseldorf -- |
| Title Page, Related U.S. Application Data | cancel "April 1, 1973" and substitute -- April 4, 1973 -- |
| Col. 1, line 2 | cancel "April 1, 1973" and substitute -- April 4, 1973 -- |
| Col. 2, line 6 | cancel "bottle" and substitute -- bottles -- |

Signed and Sealed this

Eighth Day of November 1977

[SEAL]

Attest:

RUTH C. MASON
Attesting Officer

LUTRELLE F. PARKER
Acting Commissioner of Patents and Trademarks